L. HUMISTON.
Whiffletree.

No. {714, 31,718.}   Patented Mar. 19, 1861.

Witnesses:
H. Keating
R. Fitzgerald

Inventor:
Luther Humiston

UNITED STATES PATENT OFFICE.

LUTHER HUMISTON, OF NEW HAVEN, CONNECTICUT.

ATTACHING TRACES TO WHIFFLETREES.

Specification of Letters Patent No. 31,718, dated March 19, 1861.

*To all whom it may concern:*

Be it known that I, LUTHER HUMISTON, of the city and county of New Haven, in the State of Connecticut, have invented a new and useful Improvement in Attaching Traces to Whiffletrees as a New Article of Manufacture; and I do hereby declare that the following is a full, clear, and exact description of the construction, character, and operation of the same, reference being had to the accompanying drawings, which make part of this specification, in which—

Figure 1:
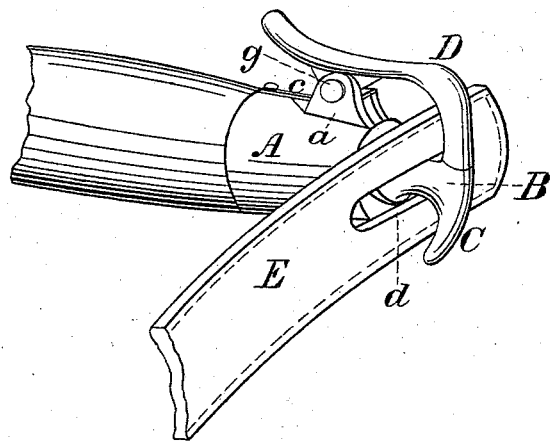
Figure 2:
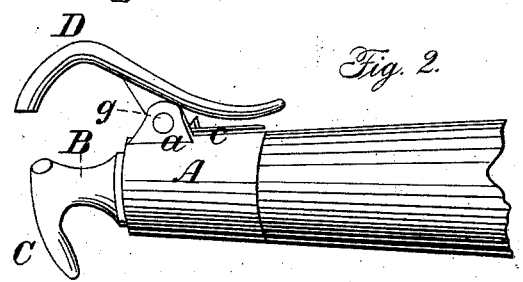
Figure 3:
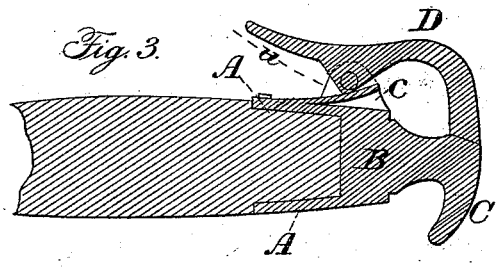

Figure 1, is a perspective view of one end of the whiffle-tree with the trace attached. Fig. 2, is a perspective view of the same, open—ready to receive the trace. Fig. 3 is a longitudinal section of the same, cut vertically through the center.

My improvement consists in making the trace fastener of a socket and projecting stud, with its hook, or "cock-eye," and lugs, or ears, to sustain the curved, or elbow-shaped, lever, by casting it all in one piece, and a curved, or elbow-shaped, lever, to be forced down by a spring so as to hold the trace perfectly secure, at all times, and yet, so that, in case of accident, it may be readily detached by simply pressing down the inner end of the lever, and forcing the upper edge of the trace outward, (toward a horizontal position,) when it will drop off at once.

I make the socket, A, Figs. 1 and 2, of malleable cast iron, or any other suitable material, by casting it in one piece with the projecting stud, B, (with its hook, or "cock-eye" C,) and the lugs, or ears, *a*, so that it will be, in its external appearance, as represented in Figs. 1 and 2, and in its internal structure, as indicated, in section, in Fig. 3.

I make the curved, or elbow-shaped, lever, D, of malleable cast iron, or any other suitable material, substantially in the form shown in Figs. 1 and 2, and indicated, in section, in Fig. 3.

I make the spring, *c*, of sheet steel, as shown in Figs. 1, 2, and 3, or of any other suitable material, and in any convenient form. I attach this spring, *c*, to the socket, A, by any convenient means.

I secure the curved, or elbow-shaped, D, in the lugs, or ears, *a*, by means of a joint pin, *g*, as shown in the drawings, or by a screw, or any other suitable, or convenient means.

To attach,—I take the trace, E, in its ordinary position, turn the upper edge, *e*, outward, or from the end of the whiffle-tree, until its width is nearly horizontal,—pass the space, or loop, *d*, upward onto the "cock-eye", C,—raise the outer end of the curved, or elbow-shaped lever, D, to the position shown in Fig. 2, then raise the upper edge, *e*, until the width of the trace, E, is vertical, which will carry the loop, or space, *d*, onto the projecting stud, B, and let down the curved lever, D, when the whole will be in the situation represented in Fig. 1.

To detach the trace, E, I raise the outer end of the curved lever, D, and turn off the trace by an operation the reverse of that for attaching, (above described.)

The projecting stud, B, may be cast, or wrought, separate from the socket, and screwed, or driven into the wood, through a hole in the end of the socket, A, if it should be thought best, at any time,—but I prefer to cast it solid, as described.

What I claim as my invention, and desire to secure by Letters Patent, is—

The use of the socket, (A,) with its projecting stud, (B,) and hook, or "cock-eye", (C,) in combination with the elbow-shaped lever, (D,) when the whole is constructed, and fitted for use, substantially, as herein described.

LUTHER HUMISTON.

Witnesses:
R. FITZGERALD,
H. KENNY.